Feb. 13, 1968        E. NEUMANN        3,369,139
ELECTRODYNAMIC TORQUE CONVERTER
Filed July 1, 1964        4 Sheets-Sheet 1
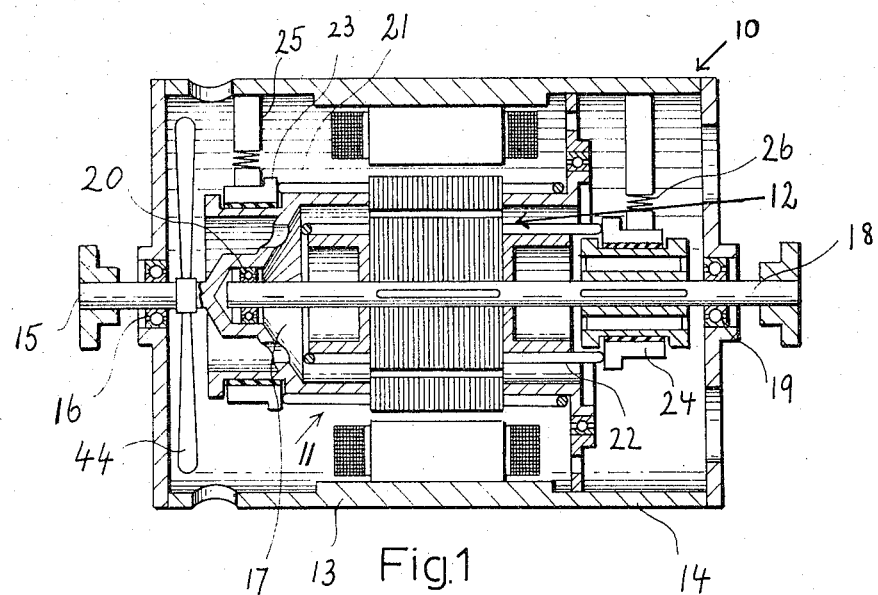
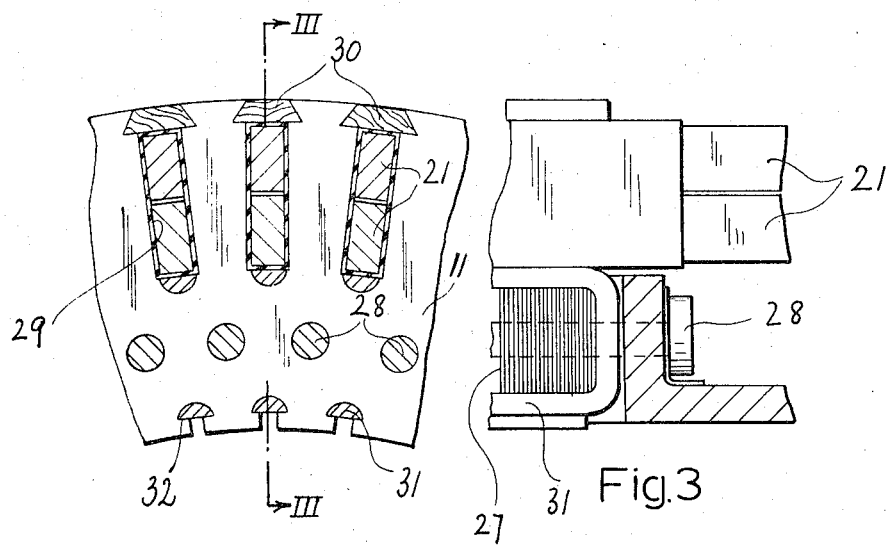
EGON NEUMANN
INVENTOR.
BY Karl G. Ross
AGENT

EGON NEUMANN
INVENTOR.

BY Karl F. Ross
AGENT

United States Patent Office 3,369,139
Patented Feb. 13, 1968

3,369,139
ELECTRODYNAMIC TORQUE CONVERTER
Egon Neumann, Vrhovac 64, Zagreb II, Yugoslavia
Filed July 1, 1964, Ser. No. 379,699
5 Claims. (Cl. 310—102)

My present invention relates to an electrodynamic torque converter adapted to transmit the power of a driving source to a driven load.

In many instances, e.g. in heavy-duty machinery, automotive vehicles, locomotives or the like, it is necessary to drive a widely varying load from a source of substantially constant speed and power, such as a diesel engine. In such systems it is desirable to couple the load to its power source through the intermediary of a torque converter which may comprise an electric generator and an electromotor connected in tandem.

The general object of my present invention is to provide a simplified torque converter combining the functions of the generator and motor in a single unit.

A more particular object of my invention is to provide a torque converter having an output shaft whose speed may vary within wide limits and which will deliver a torque varying inversely with speed upon the application of a substantially constant driving torque to an associated input shaft rotating at a more or less constant speed.

I have found, in accordance with the invention, that the foregoing objects can be realized by the provision of a unit comprising a stator and two coaxial rotors, the outer one of these rotors being coupled with the input shaft while the inner rotor is coupled with the output shaft. The stator is provided with several pole pairs, more specifically an even number of such pole pairs, for establishing a steady magnetic field in a plane transverse to the common axis of the two rotors, these rotors being provided with windings which are serially interconnected in such manner that the stator field induces a voltage in the winding of the outer rotor and then interacts with the resulting current in the winding of the inner rotor to drive the latter.

Generally, the current circulating in the winding of the outer rotor may be unidirectional or alternating, depending on whether this winding terminates in a commutator or in a set of slip rings. The current produced in the winding of the inner rotor, on the other hand, should always be unidirectional, being rectified by either the commutator or a separate rectification network in series with the slip rings. The stator poles may be magnetized in a variety of ways, i.e., they may be permanently magnetic or they may be energized from a separate current source and/or from the circulating rotor current in aiding or opposed series relationship.

In a particularly advantageous embodiment, I provide a stator with $n$ pole pairs ($n$ being an even number), the poles being spaced 90 electrical degrees apart around the rotor axis in such manner that two adjoining poles of one polarity alternates with two adjoining poles of the opposite polarity, there being always a larger main pole and a smaller auxiliary pole of the same polarity positioned next to each other to establish a principal and a supplemental magnetic field. In the simplest case, i.e. with $n=2$, the two main poles are disposed at diametrically opposite locations, as are the two auxiliary poles; since the latter poles span a smaller angle than the former, the gaps separating them do not lie along the diagonals of a square but are closer to the axis of the auxiliary poles than to that of the main poles. This arrangement makes it possible to interconnect the axially extending conductors of the two rotor windings in such a way that their currents are in phase in the region of the main poles and are in phase opposition in the region of the auxiliary poles so that, in view of the greater extent of the region of the main poles, the two windings will give rise to a net coercive force substantially in line with the axis of the auxiliary poles and in opposition to the magnetic flux component due to these poles. When the inner or output rotor loses speed as a result of an increase in its load, this coercive force will shift the effective direction of the stator flux in such a way that this flux interacts to a reduced extent with the winding of the outer rotor and to an increased extent with the winding of the inner rotor, thereby maintaining the input torque substantially constant but increasing the available output torque.

The above and other objects, features and advantages of my invention will become more fully apparent from the following detailed description, reference being made to the accompanying drawing in which:

FIG. 1 is an axial sectional view of an electrodynamic torque converter embodying my invention;

FIG. 2 is a fragmentary cross-sectional view of the torque converter of FIG. 1;

FIG. 3 is a cross-sectional view taken on line III—III of FIG. 2;

Figure 4:
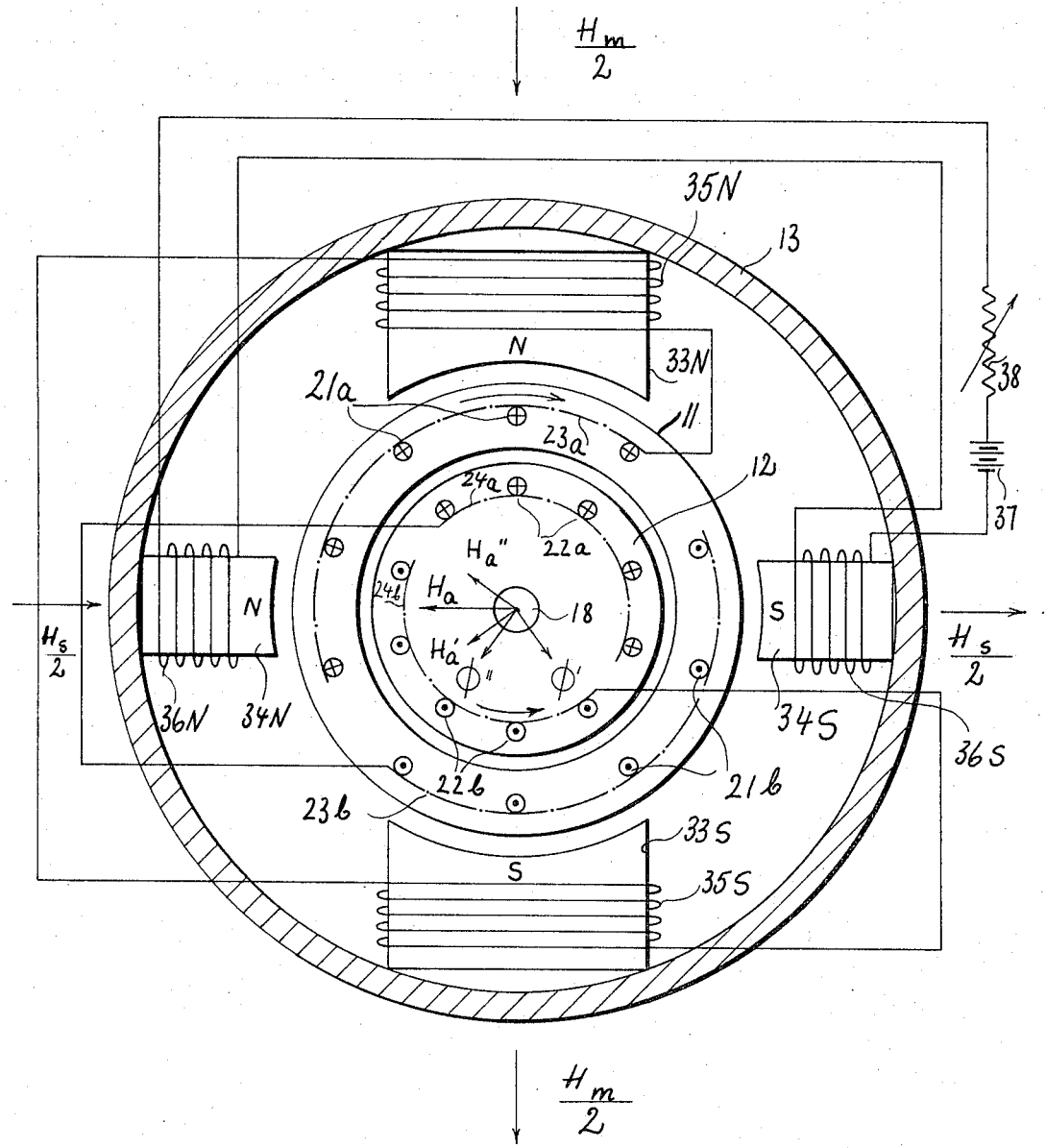
FIG. 4 is a somewhat diagrammatic overall cross-sectional view of the converter.

The unit 10 shown in FIGS. 1–5 comprises a first rotor 11, a second rotor 12 coaxially surrounded by rotor 11, and a stator 13 integral with a cylindrical housing 14 surrounding the two rotors. An input shaft 15, driven at substantially constant speed and torque from a source of motive power not shown, is journaled in bearings 16 at the left-hand end of housing 14 (as viewed in FIG. 1) and terminates in a bell-shaped extension 17 rigid with outer rotor 11. An output shaft 18, connected to a load likewise not shown, is journaled in bearings 19 on the right-hand end of housing 14 and also in bearings 20 within the bell-shaped shaft extension 17, the inner rotor 12 being keyed to this shaft 18. The rotors 11, 12 have windings 21, 22 respectively which will be described in detail hereinafter and which are electrically connected to commutators 23, 24 contacted by respective brushes 25, 26.

As best shown in FIGS. 2 and 3, the outer rotor 11 is composed of laminations 27 of ferromagnetic material held together by axially extending bolts 28. These laminations are provided with peripheral flutes 29 accommodating the winding 21 whose axially extending conductor portions are held in place by wedges 30. A further winding 31 consists of short-circuited conductor loops received in the flutes 29 and in inner peripheral recesses 32, the purpose of winding 31 being the suppression of nonradial flux components due to the passage of current through winding 21. Winding 31 also acts as a quenching reactance, thereby reducing the arcing of the commutator brushes.

Figure 5:
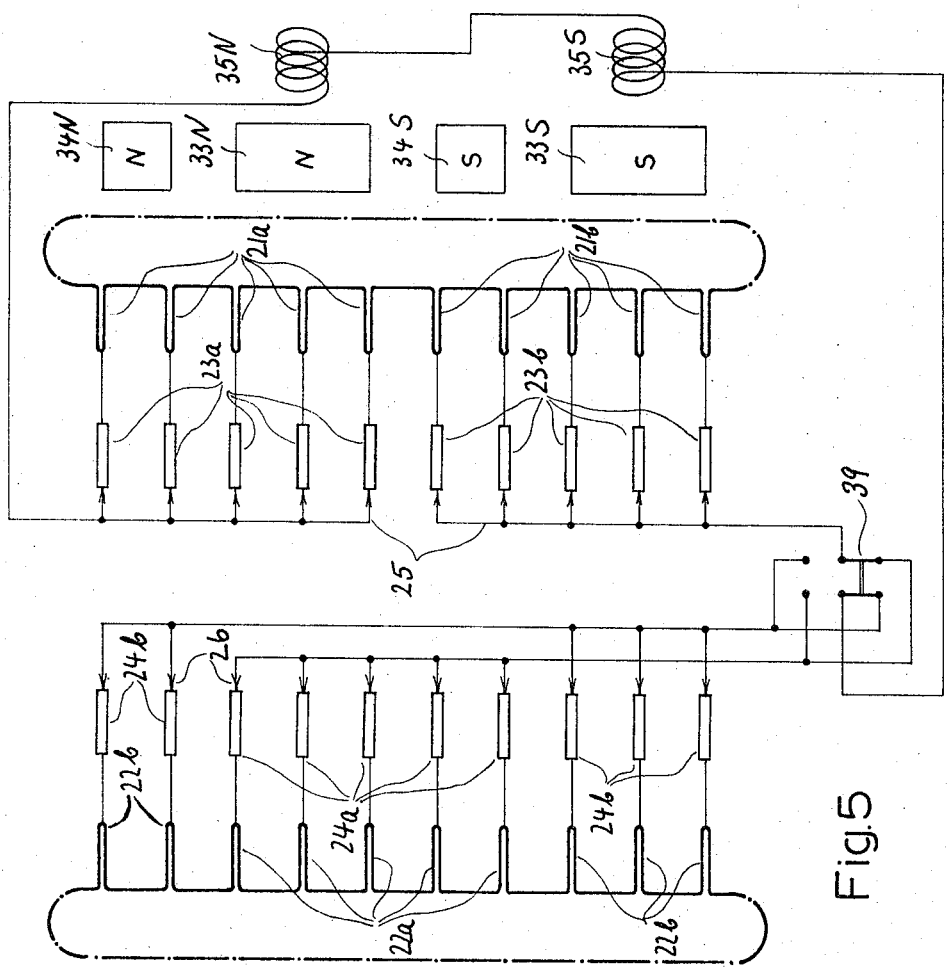
FIG. 5 is a schematic developed view of the stator and rotors of the converter.

As most clearly illustrated in FIGS. 4 and 5, stator 13 is formed with a pair of diametrically opposite main poles 33N, 33S and a pair of diametrically opposite auxiliary poles 34N, 34S at right angles thereto, the designations N and S indicating the polarity of the pole faces closest to the rotor 11. The outer winding 21 has been shown in FIG. 4 as subdivided into two groups of axially extending conductors 21a and 21b interconnected by respective portions 23a, 23b of commutator 23; the inner winding 22 is similarly shown to consist of two groups of axially extending conductors 22a, 22b interconnected by portions 24a, 24b of commutator 24. As shown by way of example, each of these conductor groups consists of five angularly spaced leads, wound back upon themselves as seen in FIGS. 2 and 3, so positioned that the majority of them are in the region of the pole faces 33N and 33S whereas the minority are adjacent the pole faces 34N and 34S. FIG. 5, in which the pole faces windings and associated commutator segments are spread out in developed form and are shifted out of radial alignment for better illustration, shows the commutator sections 23a, 23b and 24a, 24b as comprising each a set of five brushes connected in parallel. Through the intermediary of these brushes, the windings 21, 22 are interconnected in a series circuit which also includes a pair of energizing coils 35N, 36S on the main poles 33N, 33S. The auxiliary poles 34N, 34S are provided with energizing windings 36N, 36S which, in this embodiment, are connected across a source of current 37 in series with a variable resistor 38 permitting manual adjustment of the supplemental magnetic field $H_s$ generated by these auxiliary poles. The principal magnetic field $H_m$ is derived from the premagnetization of the poles 33N, 33S as supplemented by the aiding or opposing current in windings 35N, 35S.

FIG. 4 also indicates the direction of current flow in the conductors 21a, 21b and 22a, 22b, i.e. "down" (denoted by a cross) or "up" (denoted by a point). With the arrangement shown there, the conductors of windings 21, 22 carry cophasal currents in the region of pole faces 33N, 33S and antiphasal currents in the region of pole faces 34N, 34S, the magnetic fields due to these latter currents canceling so that the vector $H_a$ of the reaction field due to the rotor current lies substantially in the axis of pole faces 34N, 34S and points in the direction opposite that of field $H_s$. More generally, the vector $H_a$ is the resultant of two field vectors $H_a'$, $H_a''$ generated by rotors 11 and 12, respectively, Field $H_a'$ lies in the axial plane separating the commutator arcs 23a, 23b and substantially bisects the gaps between poles 34N, 33S and 33N, 34S. Field $H_a''$, analogously, lies in the axial plane separating the commutator arcs 24a, 24b and bisects the other two gaps of the stator. The flux $\phi'$ interacting with winding 21 is perpendicular to the field $H_a'$ and corresponds to the sum of the two fluxes $H_m$ and $H_s$; the flux $\phi''$ interacting with winding 22 is perpendicular to the field $H_a''$ and corresponds to the flux difference $H_m - H_s$.

Figure 6:
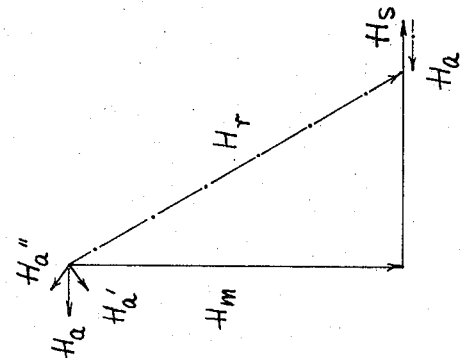
FIGS. 6 and 7 are vector diagrams relating to the converter of FIGS. 1–5.

FIG. 6 shows the relationship of the vectors $H_m$, $H_s$, $H_a$ when the system is idling, shaft 18 and rotor 12 then rotating at high speed under little or no load so that the current circulating in the rotor windings is small. The counteracting coercive force $H_a$, therefore, is almost negligible compared with the supplemental field $H_s$ so that the resultant field vector $H_r$ has a direction more or less in line with the effective primary field $\phi$ (compare FIG. 4). (It will be convenient, at this point, to disregard the compounding effect of windings 35N, 35S which are designed to modify the principal field $H_m$, according to existing requirements, and to assume that this field is substantially constant.) As indicated by the arrows in FIG. 4, the two rotors 11 and 12 rotate in opposite directions as is necessary in view of the in-phase relationship of their currents in the greater parts of their respective windings; their speed ratio, of course, must be such that the counter-E.M.F. induced in secondary winding 22 by the field $\phi''$ just balances (neglecting ohmic losses) the driving voltage induced by the field $\phi'$ in the primary winding 21.

Figure 7:
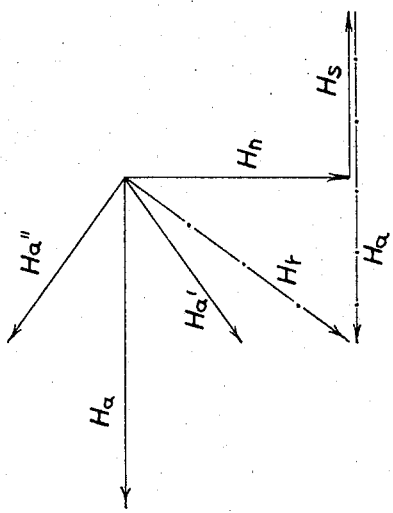

When the load is increased so that the rotor 12 slows down, the rotor current increases and produces a larger reaction field $H_a$ (FIG. 7) which substantially reduces, then cancels and finally reverses the field $H_s$ so as to change the direction of the resultant field $H_r$. Under the conditions shown in FIG. 7, which may apply to the situation in which rotor 12 is almost or completely at standstill, field $H_r$ is substantially in line with flux $\phi''$ (FIG. 4) and has only a small component in the direction of flux $\phi'$. Thus, while the current in both windings is now large, its effect upon the torque of input shaft 15 is small; on the other hand, the output torque due to the interaction of this current with flux $\phi''$ has increased at a rate substantially exceeding the rise in current flow, this torque being therefore sufficient to start an agricultural tractor or other conveyance driven through the converter 10 from, say, an internal-combustion engine operating at constant speed.

A switch 39 in FIG. 5 permits reversal of the rotation of rotor 12 by inverting the current in winding 22 with reference to that in winding 21.

Figure 8:
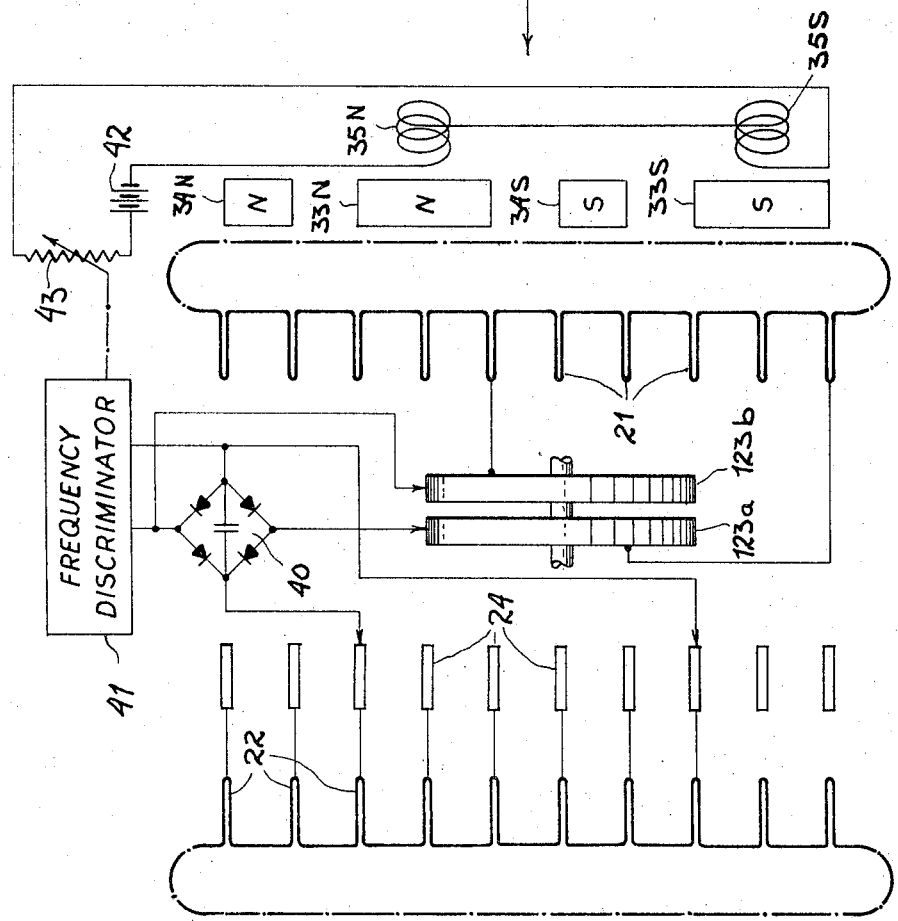
FIG. 8 is a view similar to FIG. 5, showing a modification.

In FIG. 8 I have illustrated the possibility of letting a nonrectified alternating current circulate in the primary winding 21, the commutator 23 of the proceding embodiment having been replaced by a pair of slip rings 123a, 123b connected to diametrically opposite points of winding 21. A rectifier bridge 40 lies in series with the commutator 24 and the secondary winding 22 which, accordingly, is again energized by unidirectional current. Commutator 24 is shown to have only two brushes in this case, it being apparent that this number could be increased as shown in FIG. 5. Since the network 40 together with other parts of the circuit constitutes a considerable ohmic resistance, the current in winding 21 will be substantially in phase with the induced voltage so that the reaction field will be approximately in line with and opposite the primary flux $\phi'$. Thus, as before, a slowdown in rotor speed and consequently increase in rotor current will reduce the effective field strength and the reactive torque resulting therefrom. FIG. 8 also shows a frequency discriminator 41 which controls the energization of the main windings 35N, 35S from a source 42, by way of a variable resistor 43, in response to changes in the rotative speed of input shaft 15 and primary rotor 11 which in turn alter the frequency of the alternating current in winding 21. By this means it becomes possible to adapt the stator field to different driving speeds for more economical loading of the power source, as by reducing this field whenever the driving speed increases and vice versa. The use of slip rings in lieu of commutator brushes also permits, in general, the utilization of higher input speeds.

The insulated mounting bolts 28 are, of course, representative of a variety of means for assembling the laminations of rotors 11 and/or 12; a fan 44, shown in FIG. 1, serves to circulate cooling air past the two rotor assemblies. Naturally, the arrangements described and illustrated admit of various modifications, readily apparent to persons skilled in the art, within the teachings of the foregoing disclosure and without departing from the spirit and scope of my invention as defined in the appended claims.

I claim:

1. An electrodynamic torque converter comprising an input shaft connectable to a source of driving torque, an output shaft connectable to a load, an outer rotor coupled with said input shaft, an inner rotor coaxial with said outer rotor and coupled with said output shaft, a stator having pole means for establishing a steady magnetic field in a plane transverse to the axis of said rotors, first winding means carried on said outer rotor for haivng a voltage induced therein by said magnetic field upon rotation of said outer rotor by said source, second winding means connected in series with said first winding means and carried on said inner rotor for interaction with said magnetic field, rectifier means so connected in circuit with said first and second winding means as to produce in said second winding means a unidirectional current due to said induced voltage whereby a torque is exerted upon said inner rotor for driving said load, and short-circuited third winding means on said outer rotor for substantially suppressing nonradial flux components due to the passage of current through said first winding means.

2. A torque converter as defined in claim 1 wherein said rectifier means comprises interconnected first and second commutator means respectively co-operating with said first and second winding means for establishing a path for unidirectional current therethrough of such polarity as to exert upon said inner rotor a driving torque opposite the direction of rotation of said outer rotor.

3. An electrodynamic torque converter comprising an input shaft connectable to a source of driving torque, an output shaft connectable to a load, a first rotor coupled with said input shaft, a second rotor coaxial with said first rotor and coupled with said output shaft, a stator having an even number of pole pairs for establishing a steady magnetic field in a plane transverse to the axis of said rotors, first winding means carried on said first rotor for having a voltage induced therein by said magnetic field upon rotation of said first rotor by said source, second winding means connected in series with said first winding means and carried on said second rotor for interaction with said magnetic field, said first winding means including a set of generally axially extending first conductors and said second winding means including a set of generally axially extending second conductors each subdivided into $n$ conductor groups where $n$ represents the number of said pole pairs, and interconnected first and second commutator means respectively co-operating with the conductor groups of said first and second winding means for establishing a path for unidirectional current therethrough of such polarity as to exert upon said second rotor a driving torque opposite the direction of rotation of said first rotor, the poles of said stator being spaced 90 electrical degrees apart around the rotor axis, two adjoining poles of one polarity alternating with two adjoining poles of the opposite polarity, adjoining poles of like polarity including a main pole and an auxiliary pole respectively spanning a larger and a smaller electrical angle, said first and second commutator means being so disposed that the currents through said first and second conductors are in phase in the region of said main poles and are in phase opposition in the region of said auxiliary poles.

4. A torque converter as defined in claim 3 wherein said first and second commutator means are so disposed that the in-phase currents of said first and second conductors give rise to a coercive opposing the flux component due to said auxiliary poles.

5. A torque converter as defined in claim 3 wherein said first rotor surrounds said second rotor and is disposed between the latter and said stator.

References Cited

FOREIGN PATENTS 122,675    1/1917    Great Britain.

DAVID X. SLINEY, *Primary Examiner.*